(12) United States Patent
Arehart (10) Patent No.: US 6,582,314 B1
(45) Date of Patent: Jun. 24, 2003

(54) ATTACHMENT FOR A MOTOR VEHICLE

(76) Inventor: David M. Arehart, 1967 Scarritt Pl., Oak Ridge, TN (US) 37203

( * ) Notice: Subject to any disclaimer, the term of this patent is extended or adjusted under 35 U.S.C. 154(b) by 0 days.

(21) Appl. No.: 10/114,995

(22) Filed: Apr. 4, 2002

(51) Int. Cl.[7] ................................................. A63J 23/00
(52) U.S. Cl. ......................... 472/51; 472/137; 40/209; 40/210
(58) Field of Search .......................... 472/51, 70, 137; 40/209, 210, 200

(56) References Cited

U.S. PATENT DOCUMENTS

| | | | |
|---|---|---|---|
| 777,369 A | 12/1904 | Hayes | |
| 1,635,770 A | 7/1927 | Starke | |
| 1,792,445 A | * 2/1931 | Price | .......................... 40/210 |
| D131,351 S | 2/1942 | Knapke | |
| 3,531,634 A | 9/1970 | Plouch | |
| 3,873,086 A | 3/1975 | Lee | |
| 4,928,954 A | 5/1990 | Levine et al. | |
| D316,027 S | 4/1991 | Geeting et al. | |
| 5,027,537 A | * 7/1991 | Freeman et al. | .............. 40/210 |
| D360,177 S | 7/1995 | Derrington | |
| 5,549,940 A | 8/1996 | Noone | |
| 5,878,516 A | * 3/1999 | Amirian | ........................ 40/591 |
| D429,668 S | 8/2000 | Julian | |
| 6,381,886 B1 | * 5/2002 | Chou | .......................... 40/209 |

FOREIGN PATENT DOCUMENTS

DE   1147882   4/1963

* cited by examiner

*Primary Examiner*—Kien T. Nguyen
(74) *Attorney, Agent, or Firm*—Richard C. Litman (57) ABSTRACT

A novelty device attaches to the exterior of a motor vehicle, with an upwardly extending arm producing a passive lateral oscillation due to vehicle motion to simulate a wagging animal tail. The device includes a base plate which attaches to the vehicle between a license plate mounting area and the license plate, with a bracket extending outwardly from the plane of the plate. A laterally flexible arm is attached to the distal end of the bracket. A fabric or plastic sleeve resembling an animal tail may be installed over the arm, so the covered arm resembles the tail of a team mascot animal or the like. The flexibility of the arm may be adjusted or varied by providing a series of bends at the base of the arm or elsewhere along the arm, and/or providing a bobweight at the distal end of the arm or elsewhere along the arm.

19 Claims, 4 Drawing Sheets

ATTACHMENT FOR A MOTOR VEHICLE

BACKGROUND OF THE INVENTION

1. Field of the Invention

The present invention relates generally to passively movable novelty articles, and more specifically to a flexible, elongate device for attaching to the rearward portion of a motor vehicle. The device includes a base plate which secures to the rear license plate mount of the vehicle, and an upwardly extending, laterally flexible arm for providing a lateral waving or wagging motion.

2. Description of the Related Art

With the huge numbers of motor vehicles on the road today, many vehicle owners and drivers look for ways to add a personal touch to their vehicles, without requirement for large expenditures of time or money. Many vehicle operators simply add a small flag, pennant, or other eye catching article at the upper end of a radio antenna, in order to make their vehicle stand out more visibly in a large parking area. Also, many sports fans will add the logo or other symbol representing their favorite sports team, in order to show their support for the team and solidarity with other vehicle operators who have decorated their vehicles similarly.

The overwhelming majority of such add-on devices are relatively simple, flat, temporary sheets of material which may be attached magnetically to the vehicle, or perhaps permanent decals. A relatively few three dimensional devices have been developed for attachment to a motor vehicle, and practically none of these devices provide any form of motion to attract additional attention. Of the devices which provide motion, most are active, i.e., they require some form of power source to drive the motive feature(s) of the device, rather than relying upon the motion of the vehicle. It has been demonstrated many times that an object in motion is noticed much more quickly than a stationary object, and such a movable object would thus be a more desirable means for attracting attention to a motor vehicle, for whatever reason. Yet, the known devices which provide such motion are relatively costly and complex, due to their active power requirements.

The present invention responds to this problem by providing a passively motile novelty device which secures preferably to the rear license plate mounting location of a motor vehicle. A rigid bracket extends rearwardly from the mounting plate, which is sandwiched between the license plate mounting area of the vehicle and the rear license plate. A laterally flexible arm extends upwardly from the rear of the bracket, to clear the vehicle structure. The arm may be decorated to resemble an animal tail, a sports team symbol (sword, baseball bat, etc.), or other elongate article as desired. Means are provided to adjust the frequency and amplitude of the passive lateral motion as desired.

A discussion of the related art of which the present inventor is aware, and its differences and distinctions from the present invention, is provided below.

U.S. Pat. No. 777,369 issued on Dec. 13, 1904 to Henry Hayes, titled "Motor Vehicle Attachment," describes a full scale horse model which is attached to the front of a vehicle. The Hayes attachment was developed in the "horseless carriage" era, with the intent of making a motor vehicle appear as a horse drawn conveyance. The Hayes attachment teaches away from the present attachment, as the present attachment is adapted for attachment to the rear of a motor vehicle, rather than to the front. Moreover, the Hayes device is not supported completely by the vehicle, but rather extends forwardly of the vehicle with its front being supported by an additional wheel.

U.S. Pat. No. 1,635,770 issued on Jul. 12, 1927 to Otto R. Starke, titled "Tail Wagging Toy," describes a simulated pet animal with an internal spring motor to cause the tail to wag laterally. A brake normally holds the tail stationary, with release of the brake being achieved by pressure on the back of the simulated pet, as in petting or stroking the animal. This causes the tail to wag when the spring motor is wound. The Starke device is a stand alone toy, with no provision for attaching the toy to another structure. Moreover, the Starke toy provides only active motion, requiring the winding of a spring motor for operation. The addition of the normally engaged brake which requires action on the part of an individual, further teaches away from the present invention.

U.S. Pat. No. 3,531,634 issued on Sep. 29, 1970 to Cecil W. Plouch, titled "Figurine Mount," describes a series of different mounting attachments for a figurine (animal caricature, etc.) attached to a motor vehicle. Plouch states that his figurine is capable of passive motion, but provides a rigid mounting shaft (bolt) which is secured to the vehicle structure. The only motion specifically described by Plouch is rotation about the mounting bolt; no oscillating lateral motion is provided. Also, Plouch does not provide a plate for mounting his figurine to the license plate mounting area of a vehicle, as provided by the present invention.

U.S. Pat. No. 3,873,086 issued on Mar. 25, 1975 to, Theodore W. Lee, titled "Wagging Tail Novelty," describes a three dimensional article representing the hind quarters of a dog, which is strapped to the tailgate or trunk area of a motor vehicle. An electric motor and drive system are provided within the device, to drive the generally horizontally disposed tail laterally in a horizontal arc. The motor is powered by batteries, and is controllable from within the vehicle. The Lee device teaches away from the present invention, as Lee indicates that his novelty is intended for use as a signalling device for waving at friends, and thus must be controllable. The present novelty attachment provides purely passive motion through the small lateral and other motions of the motor vehicle to which it is attached, as the vehicle travels down the road. Also, the generally vertical orientation of the present attachment provides considerably better visibility for the device than the horizontal orientation of most other devices.

U.S. Pat. No. 4,928,954 issued on May 29, 1990 to Anthony H. Levine et al., titled "Novelty Figure With Attachment Means," describes a three dimensional figure resembling the rearward half of a small animal or pet (e.g., cat). The forward portion of the device includes a band extending therefrom, which may be secured between a trunk lid, door, etc., and the jamb thereof. The device when installed provides the impression that a pet has been smashed by closing the trunk lid or door thereon. No disclosure of any specific passive motion is made by Levine et al., and no means for active motion is provided. Also, the attachment means used by Levine et al. is completely different from that used for securing the present device to a vehicle, i.e., by sandwiching a base plate between the rear license plate mounting area and the license plate.

U.S. Pat. No. 5,549,940 issued on Aug. 27, 1996 to Robert P. Noone, titled "Stock Motor Vehicle Outfitted With A Sports Theme Kit," describes a large number of add-on devices (luggage carrier, decals, floor mats, seat covers, hood ornament, etc.) displaying the logo or other symbol of a sports team. While some of the devices provide for installation on the exterior of the vehicle, none of the exterior mounted devices provide any means for motion, either passive or active. Noone does describe a series of lights having a miniature football helmet configuration, which are suspended within the rear window(s) of a vehicle. While these devices may move passively due to vehicle motion, the motion is random, and Noone does not provide any specific configuration which provides lateral oscillation of an elongate vertical component.

U.S. Pat. No. D-131,351 issued on Feb. 10, 1942 to Fred Knapke, titled "Car Emblem Or The Like," illustrates a design comprising a thin, flat plate having a representation of a baseball bat and ball across the top thereof. The design is purely two dimensional with negligible thickness, and is apparently formed from a single, flat sheet of metal. No means is apparent for extending the bat or other elongate component from the plate, or for allowing such an elongate component to oscillate laterally parallel to the plane of the plate, as provided by the present invention.

U.S. Pat. No. D-316,027 issued on Apr. 9, 1991 to David L. Geeting et al., titled "Mounting For A Retractable Vehicle Cover," illustrates a design apparently comprising a base plate with opposed lugs extending therefrom, and a bar with a pair of pins which fit removably into the lugs of the base plate. No mounting is disclosed, nor is any means of oscillation apparent in the Geeting et al. design.

U.S. Pat. No. D-360,177 issued on Jul. 11, 1995 to Bill C. Derrington, titled "Support Prop For A Pivoted License Plate Unit," illustrates a design apparently comprising a simple arm which is pivotally attached to the free corner of a hingedly mounted license plate. The arm apparently swings upwardly to brace between the plate and the plate mounting area, to hold the plate away from this area for access to a fuel filler cap or the like. No lateral or other oscillation is apparent, and in fact such would not be desirable in a device intended as a rigid brace.

U.S. Pat. No. D-429,668 issued on Aug. 22, 2000 to Patrick M. Julian, titled "Football Hitch Plug With A Display Surface," illustrates a design apparently serving as a removable cover for a receiver type hitch on a vehicle. The exposed end of the design resembles half of a football. No means of providing motion of any sort to the design is apparent, nor is any means apparent for mounting the device to the rear license plate mount area of a motor vehicle, as provided by the present invention.

Finally, German Patent Publication No. 1,147,882 published on Apr. 25, 1963 illustrates a toy motor vehicle having a pet (dog) representation therein. A mechanism is provided for causing the pet caricature to move as the vehicle moves. The device disclosed in the German Patent Publication is strictly a small scale toy, and moreover, any motion provided is of the active type, with motion being transmitted through a series of gears. No external mounting of a passively moving device is apparent in the drawings of the German Patent Publication.

In addition to the above noted references, the present inventor is aware of various small devices available in the marketplace (dolls, etc.) having spring supported components, for securing within a vehicle to provide passive motion. However, none of the devices of which the present inventor is aware, are externally attachable to the vehicle to provide the specific passive motion provided by the present novelty device.

None of the above inventions and patents, either singly or in combination, is seen to describe the instant invention as claimed.

SUMMARY OF THE INVENTION

The present invention is a novelty device for attaching to a motor vehicle, to produce a passive motion in order to attract the attention of others, demonstrate support for a team or cause, etc. The present device comprises a base plate which is secured between the license plate mounting area and the license plate of the vehicle, with a bracket extending outwardly from the plane of the base plate. A flexible arm is attached to the distal end of the bracket, and extends upwardly therefrom. The arm is configured to be relatively rigid in the fore and aft direction relative to the vehicle, but to flex laterally to the left and right relative to the vehicle. The device is preferably installed at the rear license plate location of the vehicle.

The flexible arm may be encased in a flexible fabric or plastic sleeve in order for the device to resemble the tail of an animal, as in a team mascot or the like. Alternatively, the arm may be decorated or configured to resemble virtually any other elongate object desired (e.g., baseball bat, sword, etc.). The flexibility of the arm may be varied or adjusted by various means, such as providing a series of bends at the lower end of the arm in order to produce most of the flexing at that location. The frequency and amplitude of the lateral oscillations of the arm may also be adjusted, as by adding a bobweight or the like to the distal end of the arm, or to some intermediate point along the arm as desired.

Accordingly, it is a principal object of the invention to provide a novelty attachment for the exterior of a motor vehicle, with the attachment having an upward extension for producing a passive lateral oscillation due to vehicle movement.

It is another object of the invention to provide such a novelty attachment having a base plate for attachment to the vehicle between a license plate mounting area and the license plate, preferably at the rear of the vehicle.

It is a further object of the invention to provide such a novelty attachment including means for simulating an animal tail.

Still another object of the invention is to provide such a novelty attachment including means for varying or adjusting the frequency and amplitude of the oscillations of the arm as desired.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

DETAILED DESCRIPTION OF THE PREFERRED EMBODIMENTS

The present invention is a novelty attachment for a motor vehicle, generally comprising a laterally flexible, elongate device which may be secured to a vehicle and which resembles an animal tail or the like. Other representations (swords or other sports team emblems, baseball bats or other sports equipment, etc.) may be provided for the elongate display component, as desired. The present attachment is preferably secured to the rear end of a vehicle, and includes an attachment plate configured for bolting in place between the rear license plate and the rear plate mounting area of the vehicle. The present novelty device provides vehicle owners and drivers with a means to show their support for a sports team, activity, etc. as desired.

Figure 1:
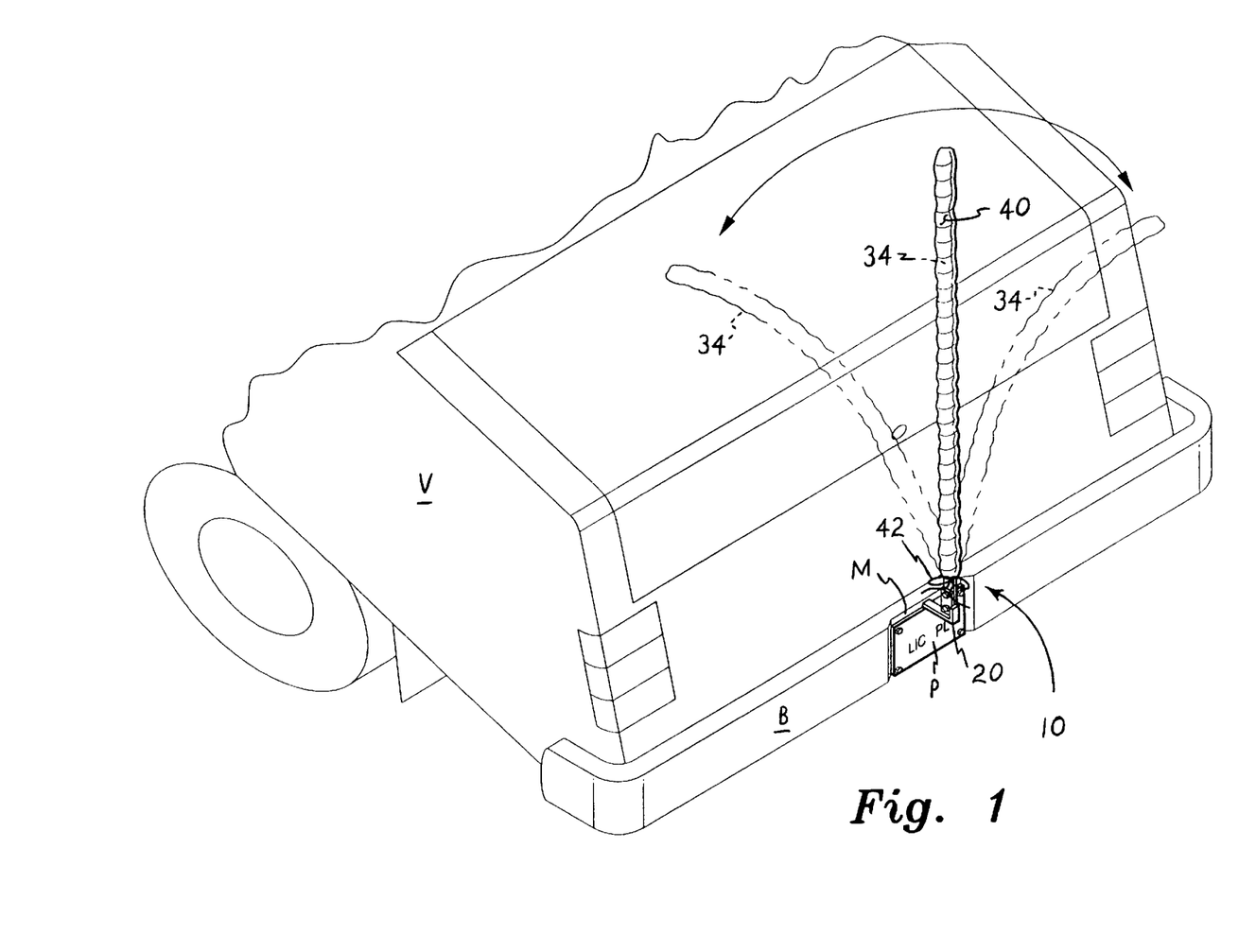
FIG. 1 is an environmental, perspective view of a novelty attachment for a motor vehicle according to the present invention, showing its general configuration and operation.

FIG. 1 of the drawings illustrates the installation of a first embodiment 10 of the present novelty attachment, mounted to the rear portion of a motor vehicle V. The motor vehicle V illustrated in FIG. 1 is a conventional passenger automobile, but it will be seen that the present novelty attachment 10 or any of its other embodiments may be secured to the rear license plate mounting area M (e.g., in the rear bumper area B, etc.) of any practicable type of motor vehicle, e.g., station wagon, van, sport utility vehicle, pickup truck, etc., as desired.

Figure 2:
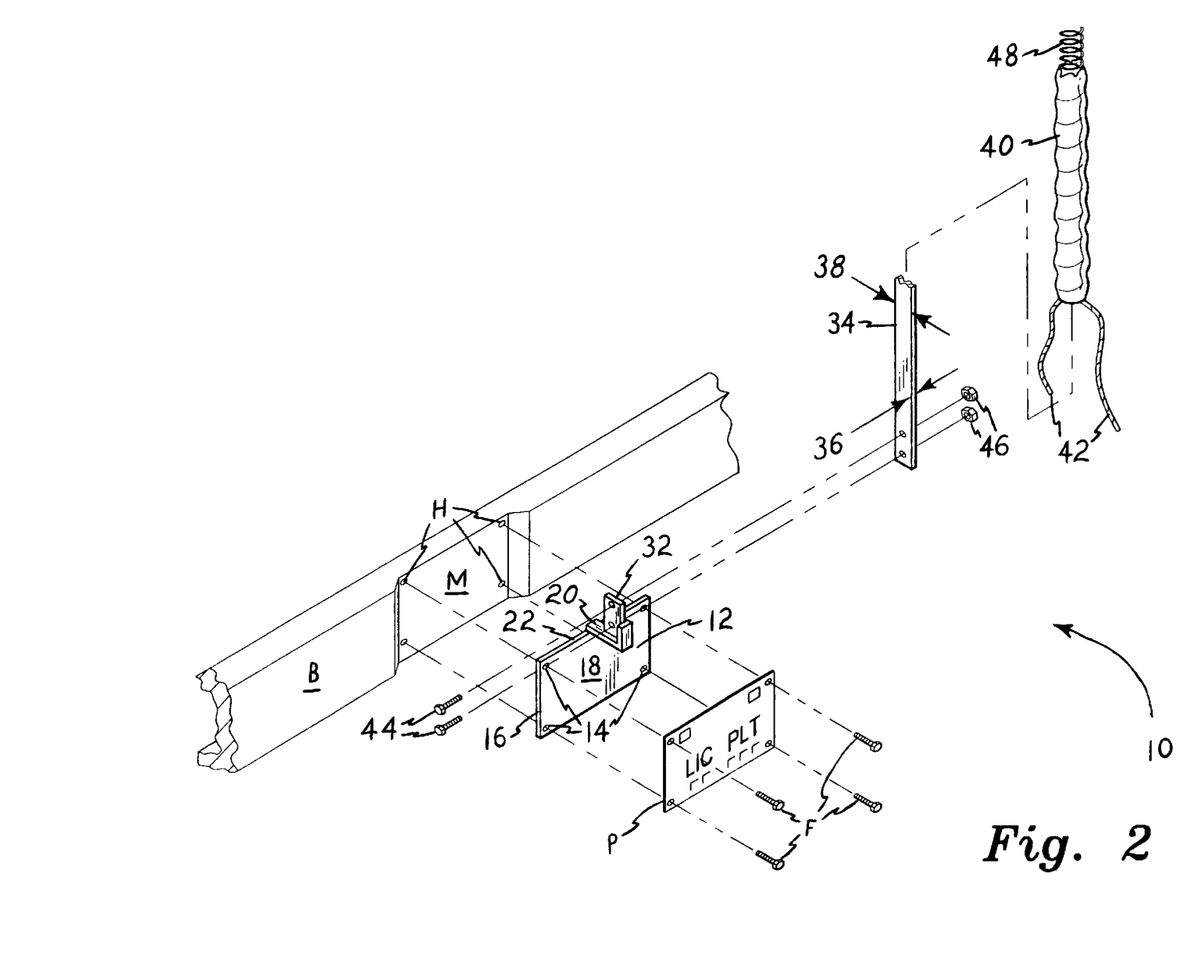
FIG. 2 is an exploded perspective view of the present novelty attachment, showing its various components and their assembly.

FIG. 2 of the drawings provides an exploded perspective view of the components of the present novelty attachment 10, and its attachment to the license plate mounting area M of the motor vehicle. The attachment 10 includes a relatively thin, generally rectangular base plate 12 having a series of mounting holes 14 therethrough and conforming to the shape and configuration of a conventional license plate. The mounting holes 14 thus align with the standard and conventional plate mounting holes H formed in the mounting area M of the vehicle, to provide for attaching the base plate 12 thereto. The vehicle license plate P is secured over the base plate 12 so as to be visible, as required by law, with the conventional license plate mounting bolts or fasteners F being used to secure both the base plate 12 and the vehicle license plate P to the license plate mounting area M of the vehicle, generally as shown in FIG. 2 of the drawings.

The relatively thin and flat configuration of the base plate 12 defines a mounting or attachment plane 16 which is disposed parallel to the license plate P when the plate P is secured to the license plate attachment or contact surface 18 of the base plate 12. An extension bracket 20 is rigidly and immovably secured to the base plate 12, and extends from the upper edge 22 of the base plate 12. The extension bracket 20 is offset from the plane 16 of the base plate 12, and extends outwardly generally normal to the plane 16 of the plate 12. This provides clearance from the vehicle structure for any article or component secured to the extension bracket 20.

Figure 3:
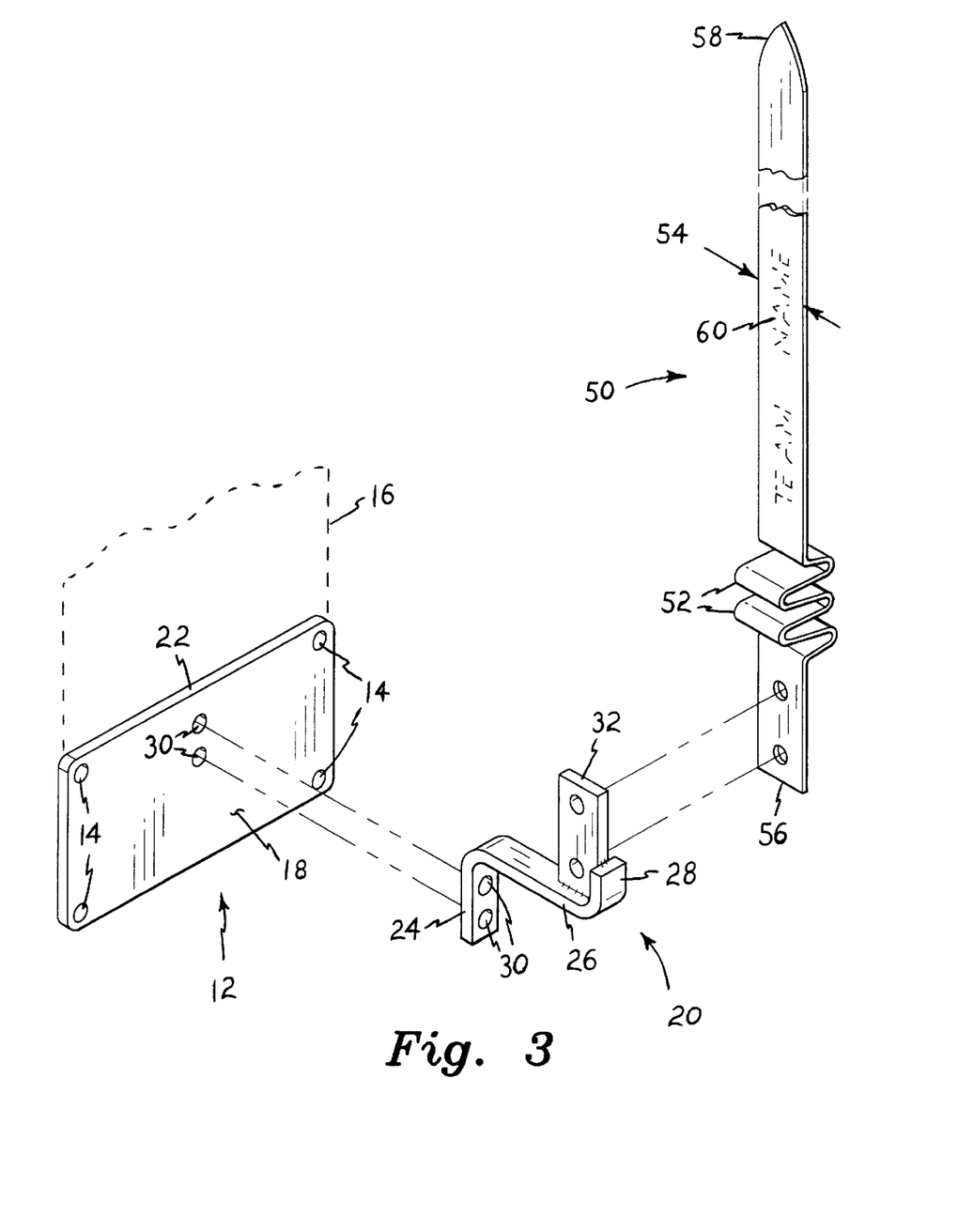
FIG. 3 is an exploded perspective view of an alternate embodiment of the present novelty attachment, including an oscillating arm having a series of bends for adjusting the oscillation of the arm.

FIGS. 1 through 3 illustrate a first embodiment extension bracket 20, with FIG. 3 illustrating details thereof. The bracket 20 comprises an elongate strip of material (rigid metal, etc.) having a base plate attachment end 24, a central portion 26, and an arm mounting end 28 opposite the base plate attachment end 24. The base plate attachment end 24 is bent or otherwise formed to be normal to the central portion 26, with the arm mounting end 28 also being normal to the central portion 26 and parallel to the base plate attachment end 24, but offset to the opposite side of the central portion from the base plate attachment end 24. The result is a generally "Z"-shaped component, with the base plate attachment end 24 providing for rigid attachment to the base plate 12 adjacent the upper edge 22 thereof, e.g., by welding, bolting in place as provided by the corresponding holes 30 through the plate 12 and bracket attachment end 24 in FIG. 3, or other means.

The distal, arm mounting or attachment end 28 of the bracket 20 includes an arm attachment plate 32 secured thereto and to the adjacent end of the central portion 26 of the bracket 20 (e.g., welded, etc.). The arm attachment plate 32 extends upwardly or generally vertically when the bracket 20 and base plate 12 assembly are secured to a motor vehicle, and is substantially normal to the mounting plane 16 of the base plate 12. In other words, the arm attachment plate 32 is positioned with its thickness oriented laterally relative to the vehicle when the assembly 10 is secured to the vehicle. The arm attachment plate 32 provides means for the attachment of a laterally flexible arm 34 to the vehicle, with the arm 34 extending substantially upwardly from the bracket 20.

FIGS. 1 and 2 illustrate a first embodiment of such a laterally flexible arm 34. The arm 34 is formed of a relatively wide, thin sheet of flexible material (e.g., sheet metal, plastic, etc.), with its thickness 36 being oriented laterally, i.e., its plane being parallel to the plane of the arm attachment plate 32 of the extension bracket 20. The relatively wide width 38 of the arm 34, being oriented parallel to the length of the vehicle and normal to the plane 16 of the base plate 12, resists bending in that direction. However, the relatively thin lateral dimension 36 of the flexible arm 34 parallel to the plane 16 of the base plate 12 allows the arm 34 to flex or bend and arcuately oscillate parallel to that plane when the assembly 10 is secured to the vehicle as shown in FIG. 1. Slight lateral motions of the vehicle thus cause the arm 34 to wag laterally back and forth to the left and right.

The present novelty attachment 10 is particularly well suited as a display of fan support for a sports team or the like. As many sports teams have animal mascots and/or team names (e.g., Clemson Tigers, etc.), the present attachment 10 may be used to represent or resemble the tail of an animal, if so desired. FIGS. 1 and 2 illustrate a covering or sleeve 40 formed of a thin, flexible material (fabric, plastic sheet, etc.) which may be installed over the flexible arm 34. By providing a pattern on the sleeve 40 (e.g., tiger stripes, etc.) the present novelty attachment provides a humorous indication of the support or loyalty of the owner and/or driver of the vehicle to which the present attachment 10 is secured. A draw string 42 may be used to secure the sleeve 40 to the remainder of the attachment 10, by tying the string around the attachment bracket 20 or around the protruding bolts 44 and nuts 46 used to secure the arm 34 to the bracket attachment plate 32 of the bracket 20. A coil spring 48, or perhaps a flexible plastic or rubber tube, etc., may be installed over the flexible arm 34 before installing the covering sleeve 40, in order to prevent the sleeve 40 from collapsing laterally due to aerodynamic pressure during vehicle motion. It will be seen that the spring 48 or other flexible tubular element, may have a larger diameter distal portion if so desired, with the sleeve 40 being configured to resemble a baseball bat, if so desired. A sports team name, logo, etc. may be placed upon the sleeve 40, in addition to or in lieu of any other pattern (tiger stripes, etc.) as desired.

FIG. 3 of the drawings illustrates a second embodiment of the laterally flexible arm, designated as arm 50. The arm 50 is formed similarly to the arm 34 of FIG. 2, but includes at least one (and preferably a series of) alternatingly opposed bend(s) 52 disposed across its width 54. These bends 52 may be installed adjacent the attachment base 56 of the arm 50, or at some other area of the arm 50 as desired. The bends 52 essentially "condense" the a portion of the length of the arm 50 across a shorter linear distance, thus providing greater flexibility along that distance. Thus, a series of bends near the base 56 of the arm 50, results in the arm 50 flexing or bending more at the base, rather than uniformly along its length. The bends 52 may be located at some other point or points along the length of the arm 50 as desired, in order to cause the arm 50 to bend or flex more at the location of the bends.

The arm 50 of FIG. 3 does not include any form of cover or sleeve thereover, but rather is configured with a tapered distal tip 58 in order to resemble a sword or blade. This enables the arm 50 to resemble a sports team symbol for such teams that use such symbols or devices (e.g., Tennessee Titans, etc.). The flat width of the arm 50 may be used to display the appropriate team name 60 or other slogan, etc. thereon, if so desired. As in the embodiment of FIGS. 1 and 2, a spring or the like and a sleeve may be installed over the arm 50 if so desired, in order to alter its appearance as desired.

Figure 4:
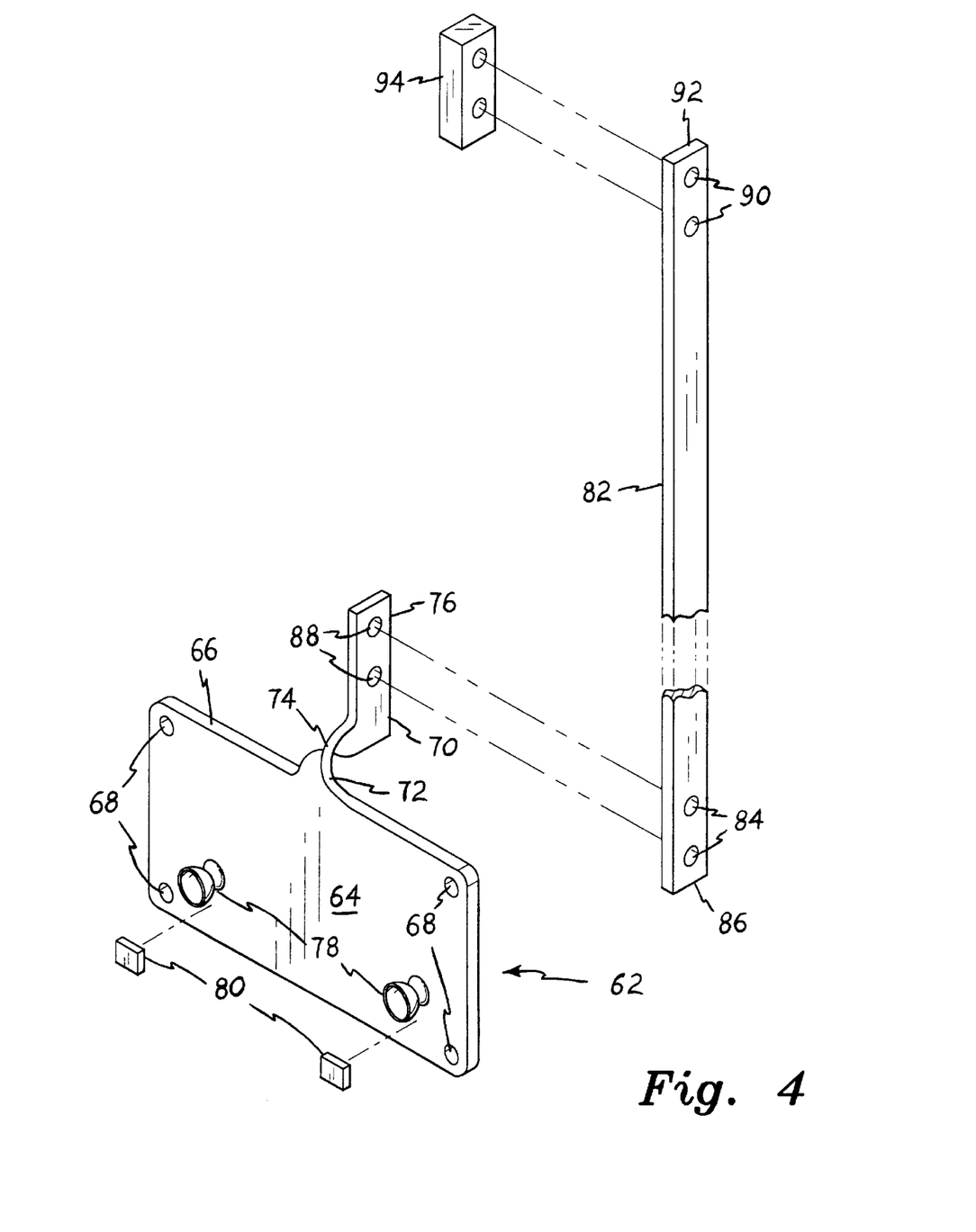
FIG. 4 is an exploded perspective view of another embodiment of the present novelty attachment, disclosing a different arm attachment bracket on the plate and a bobweight installation.

FIG. 4 illustrates further embodiments of the present novelty attachment, in which a different configuration is provided for a base mounting plate 62. The plate 62 is formed of a relatively rigid sheet of durable material (e.g., sixteen gauge sheet steel or other metal, or a thicker plastic sheet, etc.) and has a shape or configuration substantially congruent with a conventional license plate in order to bolt or otherwise attach to the license plate mounting area of the vehicle, in the manner of the base plate 12 of FIGS. 2 and 3. The base plate 62 includes a license plate mounting area surface 64, i.e., the surface which faces the vehicle structure and opposite that to which the license plate is attached, an upper edge 66, and a plurality of mounting holes 68 formed therethrough.

The base plate 62 of FIG. 4 differs from the base plate 12 of FIGS. 2 and 3, in that the arm attachment extension bracket 70 is formed integrally with the plate 62 of the same piece of material, rather than being a separate component(s) which are bolted, riveted, welded, or otherwise attached to the base plate. The extension bracket 70 comprises an elongate, generally L-shaped extension from the upper edge 66 of the plate 62, with the extension being bent over substantially normal to the plane of the base plate 62 at its base plate attachment end or portion 72. The central portion 74 of the extension bracket 70 thus extends outwardly from the plane of the base plate 62, in the manner of the central portion 26 of the extension bracket 20 of the embodiment of FIGS. 1 through 3.

However, the central portion 74 of the extension bracket 70 of the embodiment of FIG. 4, includes a right angle twist therein. This twisted central portion 74 of the bracket 70 turns the distal arm attachment end portion 76 of the bracket 70 in an upward orientation when the base plate 62 is mounted conventionally upon a vehicle, with the arm attachment end 76 thus being normal to both the plane and the upper edge 66 of the base plate 62. The result is that the distal arm attachment end 76 has the same orientation as the arm attachment end 32 of the built-up bracket 20 of the embodiment of FIGS. 1 through 3, for proper attachment of the laterally flexible arm thereto. However, the monolithic, unitary construction of the plate 62 and bracket 70 provides a significant savings of labor in the construction of the device.

The base plate 62 of FIG. 4 also discloses additional padding or cushioning means disposed upon the mounting area contact surface 64 thereof. In many vehicles, the license plate (and thus the base plate 12 or 62 of the present invention) may be secured by only a pair of bolts or fasteners through the upper mounting holes. While this may be sufficient to secure a license plate, the mass, inertia, and aerodynamic drag produced by the flexible arm of the present invention can result in a torque about such upper attachment bolts, which causes the lower portion of the base plate 12 or 62 to bang against the lower portion of the plate mounting area. Accordingly, the base plate 62 (and/or the base plate 12, if so desired) includes cushioning means comprising suction cups 78 and/or resilient pads 80, to prevent the base plate from rocking.

The laterally flexible arm 82 of FIG. 4 also differs from the flexible arms 34 and 50 of FIGS. 2 and 3, in that it includes means for attaching a weight thereto in order to change the period of oscillation of the arm 82. The arm 82 includes a pair of attachment holes 84 at the lower or attachment end 86 thereof for bolting the arm 82 to the distal arm attachment end 76 of the extension bracket 70 through corresponding holes 88 therein, in the manner of the other assemblies illustrated in FIGS. 1 through 3 of the drawings.

However, the flexible arm 82 also includes additional attachment holes 90 at the upper or distal end 92 thereof, providing for the attachment of a bobweight 94 to the arm 82. It is well known that the period or frequency of a pendulum is directly proportional to the distance of the center of its mass from the pivot or suspension point. Accordingly, the addition of a bobweight 94 at the distal end 92 of the arm 82, moves the center of mass of the arm 82 toward the upper distal end 92, thereby decreasing the frequency of oscillation of the arm 82. It will be seen that the mass of the bobweight 94 may be adjusted as desired to obtain a desired oscillation frequency, and/or the bobweight may be secured to the arm 82 at some point other than at its distal tip 92 and/or one or more additional bobweights may be secured to the arm 82 at various points therealong by means of additional attachment holes and conventional mounting bolts, as desired.

In conclusion, the present novelty attachment for a motor vehicle provides a humorous and eye catching means for the sports fan to demonstrate and display his or her support for a sports team or other cause having a symbol, logo, etc. which might be represented by a flexible elongate attachment to a motor vehicle. The present attachment is easily but securely attached to a motor vehicle, using the conventional license plate attachment area universally provided at least at the rear of all motor vehicles The flexible arm may be covered or decorated in innumerable ways to represent the tail of a team mascot animal, or perhaps another implement (sword, baseball bat, etc.) as desired. The frequency of the oscillation is also easily adjusted by means of varying the width and/or thickness of the flexible arm, providing a bobweight(s) along the arm, and/or selecting the materials from which the arm is formed (aluminum sheet, fiber glass or other composite material, etc.) as desired.

The present novelty attachment is easily constructed of widely available materials, and may thus be manufactured relatively economically. The present novelty attachment will thus find wide favor among sports fans and others who wish to show their support for a sports team or other cause in a humorous and eye catching manner.

It is to be understood that the present invention is not limited to the embodiments described above, but encompasses any and all embodiments within the scope of the following claims.

I claim:

1. A novelty attachment for a motor vehicle having at least a license plate mounting area and a license plate, comprising:
   a base plate for attachment to the license plate mounting area of the vehicle;
   said base plate defining a mounting plane and including at least an upper edge and a license plate mounting area surface;
   an extension bracket extending from said base plate;
   said extension bracket further including a distal, arm mounting end;
   a flexible arm extending upwardly from said arm mounting end of said extension bracket; and
   cushioning means disposed upon said license plate mounting area surface of said base plate.

2. The novelty attachment for a motor vehicle according to claim 1, further including:
   a flexible sleeve covering said flexible arm, the sleeve being configured to resemble an animal tail.

3. The novelty attachment for a motor vehicle according to claim 2, further including a coil spring disposed about said flexible arm and within said flexible sleeve.

4. The novelty attachment for a motor vehicle according to claim 1, wherein:
   said extension bracket comprises an elongate piece of material having a central portion, a base plate attachment end normal to said central portion, and an arm attachment end normal to said central portion and opposite said base plate attachment end;
   said central portion of said extension bracket is disposed substantially normal to said mounting plane of said base plate; and
   said arm attachment end of said extension bracket further includes an arm attachment plate secured thereto and to said central portion adjacent said arm attachment end, with said arm attachment plate being disposed normal to said mounting plane of said base plate.

5. The novelty attachment for a motor vehicle according to claim 1, wherein:
   said extension bracket comprises an elongate piece of material having a central portion, a base plate attachment end secured to said base plate, and an arm attachment end opposite said base plate attachment end, the central portion of said extension bracket being disposed substantially normal to said mounting plane of said base plate; and
   the central portion of said extension bracket further includes a right angle twist therein, whereby said arm attachment end of said extension bracket is normal to said mounting plane and to said upper edge of said base plate.

6. A novelty attachment for a motor vehicle having at least a license plate mounting area and a license plate, comprising:
   a base plate for attachment to the license plate mounting area of the vehicle;
   said base plate defining a mounting plane and including at least an upper edge and a license plate mounting area surface;
   an extension bracket extending from said base plate;
   said extension bracket further including a distal, arm mounting end; and
   a flexible arm extending upwardly from said arm mounting end of said extension bracket;
   wherein:
      said flexible arm is a thin sheet of resilient metal;
      said flexible arm has a substantial width normal to said mounting plane of said base plate for precluding bending toward and away from said base plate; and
      said flexible arm further flexes in a plane parallel to said mounting plane of said base plate for arcuately oscillating parallel to said base plate.

7. The novelty attachment for a motor vehicle according to claim 6, further including at least one bend formed across said width of said flexible arm, for facilitating lateral flexing of said flexible arm.

8. The novelty attachment for a motor vehicle according to claim 6, further including at least one bobweight secured to said flexible arm.

9. The novelty attachment for a motor vehicle according to claim 8, wherein:
   said flexible arm has an upper distal end; and
   said bobweight is secured to said upper distal end of said flexible arm.

10. A novelty attachment for a motor vehicle having at least a license plate mounting area and a license plate, comprising:
   a base plate for attachment to the license plate mounting area of the vehicle, between the license plate mounting area and the license plate of the vehicle;
   said base plate further including at least a mounting plane, an upper edge, a license plate mounting area contact surface, and a plurality of mounting holes formed therethrough;
   an extension bracket extending from said upper edge of said base plate, and outwardly from said mounting plane of said base plate;
   said extension bracket further including a distal, arm mounting end;
   a laterally flexible arm extending upwardly from said arm mounting end of said extension bracket;
   said flexible arm having a substantial width normal to said mounting plane of said base plate for precluding bending toward and away from said base plate; and
   said flexible arm further flexing in a plane parallel to said mounting plane of said base plate for arcuately oscillating parallel to said base plate.

11. The novelty attachment for a motor vehicle according to claim 10, further including:
   a flexible sleeve covering said flexible arm, said flexible sleeve being configured to resemble an animal tail.

12. The novelty attachment for a motor vehicle according to claim 11, further including a coil spring disposed about said flexible arm and within said flexible sleeve.

13. The novelty attachment for a motor vehicle according to claim 10, wherein said flexible arm is a thin, resilient sheet of metal.

14. The novelty attachment for a motor vehicle according to claim 13, further including at least one bend formed across said width of said flexible arm, for facilitating lateral flexing of said flexible arm.

15. The novelty attachment for a motor vehicle according to claim 13, further including at least one bobweight secured to said flexible arm.

16. The novelty attachment for a motor vehicle according to claim 15, wherein:
   said flexible arm has an upper distal end; and said bobweight is secured to said upper distal end of said flexible arm.

17. The novelty attachment for a motor vehicle according to claim 10, wherein:

said extension bracket comprises an elongate piece of material having a central portion, a base plate attachment end normal to said central portion, and an arm attachment end normal to said central portion and opposite said base plate attachment end; and said arm attachment end of said extension bracket further includes an arm attachment plate secured thereto and to said central portion adjacent said arm attachment end, with said arm attachment plate being disposed normal to said mounting plane of said base plate.

18. The novelty attachment for a motor vehicle according to claim 10, wherein:

said extension bracket comprises an elongate piece of material having a central portion, a base plate attachment end secured to said base plate, and an arm attachment end opposite said base plate attachment end; and said central portion of said extension bracket further includes a right angle twist therein, whereby said arm attachment end of said extension bracket is normal to said mounting plane and to said upper edge of said base plate.

19. The novelty attachment for a motor vehicle according to claim 10, further including cushioning means disposed upon said license plate mounting area surface of said base plate.

* * * * *